United States Patent [19]
Orzal

[11] Patent Number: 5,586,630
[45] Date of Patent: Dec. 24, 1996

[54] SPRING APPLIED/FLUID RELEASED PARKING BRAKE

[75] Inventor: Gregory J. Orzal, Hartford, Wis.

[73] Assignee: Wacker Corporation, Menomonee Falls, Wis.

[21] Appl. No.: 440,908

[22] Filed: May 15, 1995

[51] Int. Cl.$^6$ ............................................. B60K 41/26
[52] U.S. Cl. .................. 192/4 R; 74/411.5; 188/72.3; 188/72.4; 192/4 A; 303/89
[58] Field of Search ......................... 192/4 R, 4 A; 188/72.1, 72.2, 72.3, 72.4, 353; 303/89; 180/370; 74/391, 411.5

[56] References Cited

U.S. PATENT DOCUMENTS

| | | | |
|---|---|---|---|
| 3,312,314 | 4/1967 | Peters | 188/152 |
| 3,373,850 | 3/1968 | Helmer | 192/4 A |
| 3,374,692 | 3/1968 | Kitch et al. | 192/4 A X |
| 3,482,666 | 12/1969 | Case et al. | 188/265 |
| 4,037,694 | 7/1977 | Keese | 192/4 A |
| 4,114,479 | 9/1978 | Ashfield | 192/4 A X |
| 4,487,301 | 12/1984 | Harrison | 74/411.5 X |
| 4,519,483 | 5/1985 | Schlicker | 192/4 A |
| 4,635,491 | 1/1987 | Yamano et al. | 74/411.5 X |
| 4,652,059 | 3/1987 | Wittich | 303/89 |
| 4,662,489 | 5/1987 | Honekamp et al. | 192/4 A |
| 5,145,240 | 9/1992 | Harless et al. | 303/89 |
| 5,163,741 | 11/1992 | Hsiu | 303/89 |
| 5,183,138 | 2/1993 | Jolliff | 192/4 A X |
| 5,365,804 | 11/1994 | Downs et al. | 192/4 A X |
| 5,375,684 | 12/1994 | Asher et al. | 199/353 |

Primary Examiner—Andrea L. Pitts
Attorney, Agent, or Firm—Nilles & Nilles, S.C.

[57] ABSTRACT

A parking brake assembly positively engages the drive gear or another component of a wheel drive train and thus cannot slip. Accordingly, the brake assembly can be smaller in size, is less expensive to construct and install, and requires lower release pressures than are required for friction brake assemblies of comparable capacity. When used with industrial vehicles powered via an axle-mounted drive gear, the brake assembly preferably includes a pinion which meshes with the drive gear and a piston on which the pinion is supported. The piston (1) is spring applied towards a first position in which the piston and thus the shaft and the drive gear are mechanically locked from rotation and (2) can be pressure-driven to a second position permitting free rotation of the piston, pinion, and drive gear.

18 Claims, 5 Drawing Sheets

SPRING APPLIED/FLUID RELEASED PARKING BRAKE

BACKGROUND OF THE INVENTION

1. Field of the Invention

The invention relates to vehicle brake assemblies and, more particularly, to parking brake assemblies designed to prevent vehicle wheels from rotating even when the vehicle is positioned on a steep grade.

2. Discussion of the Related Art

Parking brake assemblies are well known for preventing wheels of motor vehicles from rotating when the vehicle is not in operation. Parking brake assemblies also traditionally function as emergency brakes to automatically brake the vehicle wheels in the event of an externally transmitted emergency signal, fluid pressure loss, etc. The typical parking brake assembly is a spring applied/fluid released disc brake assembly having one or more friction pads engaging a rotor to brake the vehicle. Because friction brakes rely on friction for braking rather than a positive mechanical locking, the brake pads will slip on the rotor once a designated torque threshold is exceeded. This torque threshold is a function of the number and size of the friction pads, the type of friction material employed for the pads, and the spring force acting on the pads. The most common way to increase this torque threshold is to increase the spring force acting on the pads. However, the hydraulic or pneumatic pressure required to overcome the spring force must necessarily increase with the applied spring force—requiring more energy to pressurize the fluid and requiring the use of relatively expensive high pressure pumps, fittings, hoses, etc.

The torque threshold problem associated with friction brakes is especially evident with trench rollers and other industrial vehicles which often must be braked on steep grades. Indeed, government regulations and industry requirements demand that parking brakes for these types of vehicles apply sufficient torque to brake the vehicle on a grade which is at least as steep as that up which the vehicle is capable of climbing. Friction brakes traditionally used in this type of vehicle and exhibiting an acceptably high slip threshold have a relatively large physical size, require high release pressures on the order of 300 psi (2 MPa), and are prohibitively costly. Friction brakes also are prone to sticking, are prone to wear, and require frequent maintenance or replacement.

OBJECTS AND SUMMARY OF THE INVENTION

It is therefore an object of the invention to provide a parking/emergency brake assembly which is capable of preventing the wheels of a vehicle from rotating on a very steep grade and which is relatively compact, inexpensive, and requires much lower release pressures than are required by friction brake assemblies of comparable capacity.

Another object of the invention is to provide an emergency/parking brake assembly exhibiting reduced running friction.

In accordance with a first aspect of the invention, this object is achieved by providing a parking brake assembly comprising a piston which at least selectively engages a component of the drive train and which is movable axially from a first position in which the piston and the drive train are mechanically locked from rotation to a second position in which the piston and the drive train are freely rotatable.

Preferably, the assembly further comprises a brake housing, and the piston has a first end slidably and sealingly disposed in the brake housing and a second end protruding from the brake housing and engaging the component of the drive train. In the case of an industrial vehicle having individually driven wheels, the component of the drive train comprises a drive gear for the wheel, and the brake assembly further comprises a brake pinion which is non-rotatably mounted on the second end of the piston and which meshes with the drive gear.

The desired mechanical locking is facilitated by providing a cavity in the brake housing a portion of which has a designated, non-circular shape, and by mounting a locking flange on the first end of the piston. The locking flange (1) has a shape which at least generally complements that of the portion of the cavity, (2) is located within the portion of the cavity and engages a wall thereof to prevent rotation of the piston when the piston is in the first position, and (3) is located outside of the portion of the cavity to permit rotation of the piston when the piston is in the second position.

The parking brake assembly preferably also has emergency braking capability, in which case a spring is provided which biases the piston axially towards the first position and a source of fluid pressure is provided which is selectively operable to drive the piston axially into the second position against the biasing force of the spring.

Another object of the invention is to provide a vehicle drive train employing a reliable, compact, and inexpensive parking/emergency brake assembly.

In accordance with another aspect of the invention, this object is achieved by providing (1) a drive train for supplying power to a ground engaging wheel, and (2) a parking brake assembly for mechanically locking the drive train from rotation. The drive train includes a hub on which the wheel is non-rotatably mounted, an axle on which the hub is non-rotatably mounted, a drive gear non-rotatably mounted on the axle, and a motor supplying motive power to the drive gear. The parking brake assembly includes a piston and a pinion which is mounted on the piston and which meshes with the drive gear. The piston is slidable axially from a first position in which the pinion and the drive gear are mechanically locked from rotation to a second position in which the pinion and the drive gear are freely rotatable.

Yet another object of the invention is to provide a method of reliably braking a drive train in a parking or emergency situation.

In accordance with yet another aspect of the invention, this object is achieved by permitting free rotation of a drive train for a ground engaging wheel, and then preventing rotation of the drive train by moving a piston of a parking brake assembly axially from a first position in which the piston and the drive train are mechanically locked from rotation to a second position in which the piston and the drive train are freely rotatable.

The brake assembly also preferably functions as an emergency brake, in which case the preventing step includes applying a fluid actuating force to the piston of sufficient magnitude to overcome a spring-applied biasing force.

Preferably, the preventing step comprises moving the piston from a first location in which a non-circular locking flange, mounted on an end of the piston remote from the pinion, is located outside of a complimentary shaped cavity, to a second position in which the locking flange is located within the cavity and is prevented from rotating by engaging a wall of the cavity.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENT

1. Resume

Pursuant to the invention, a parking brake assembly positively engages the drive gear or another component of the wheel drive train and thus cannot slip. Accordingly, the brake assembly can be smaller in size, is less expensive to construct and install, and requires lower release pressures than are required for friction brake assemblies of comparable capacity. When used with industrial vehicles powered via an axle-mounted drive gear, the brake assembly preferably includes a pinion which meshes with the drive gear and a piston on which the pinion is supported. The piston (1) is spring applied towards a first position in which the piston and thus the shaft and the drive gear are mechanically locked from rotation and (2) can be pressure-driven to a second position permitting free rotation of the piston, pinion, and drive gear.

2. System Overview

Figure 1:
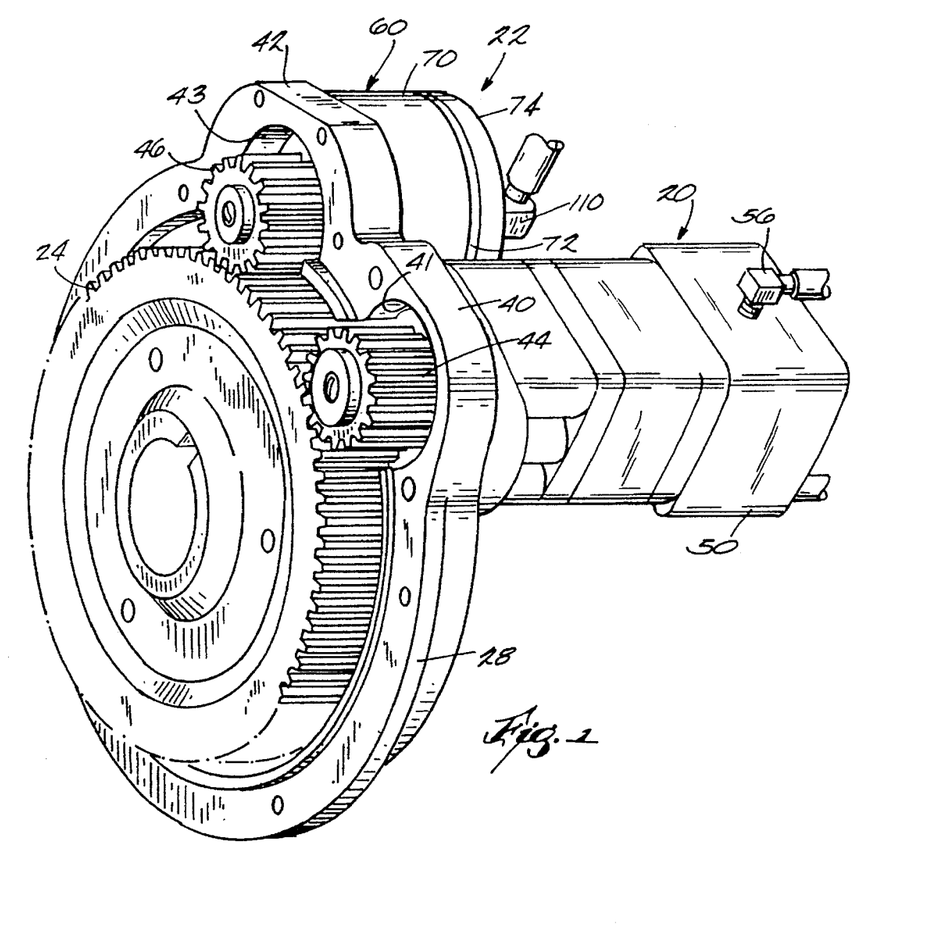
FIG. 1 is a perspective view of a portion of a drive train for an industrial vehicle employing the inventive parking brake assembly.
Figure 2:
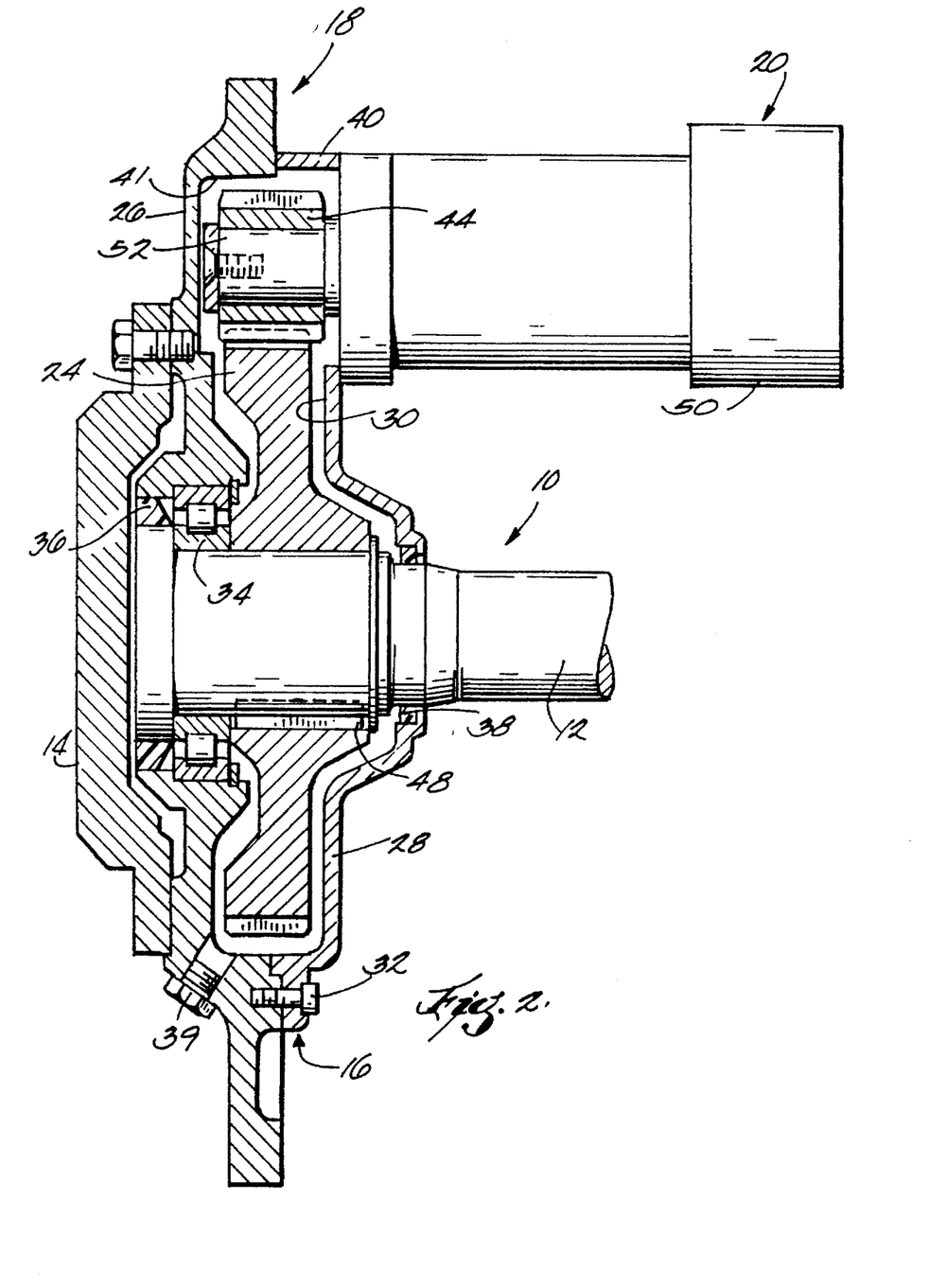
FIG. 2 is a sectional side elevation view of a portion of the drive train of FIG. 1.
Figure 3:
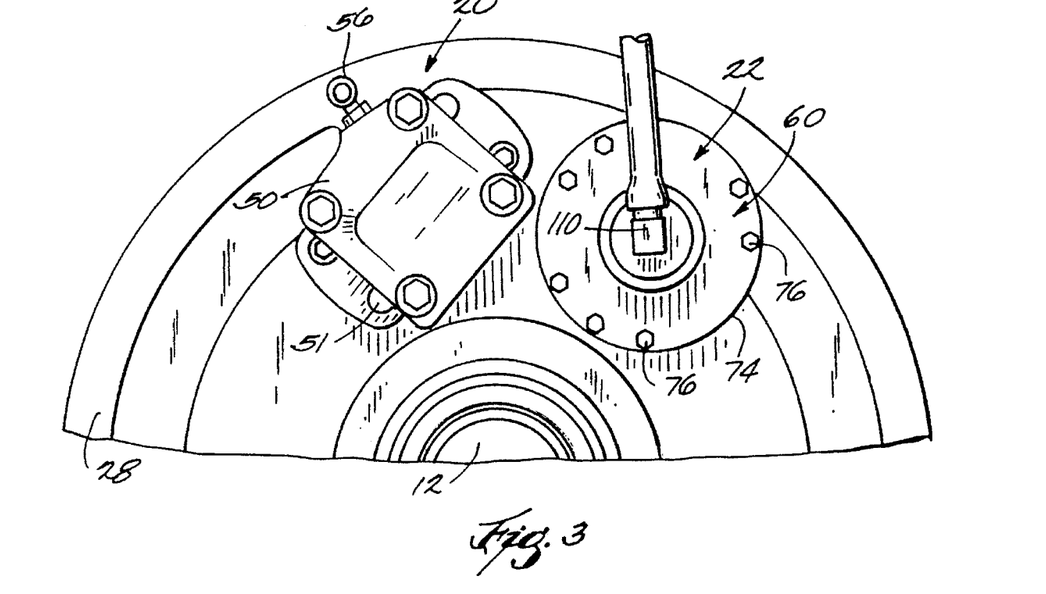
FIG. 3 is a rear end view of a portion of the drive train of FIGS. 1 and 2 and illustrating the parking brake assembly and the surrounding portions of the drive train.
Figure 7:
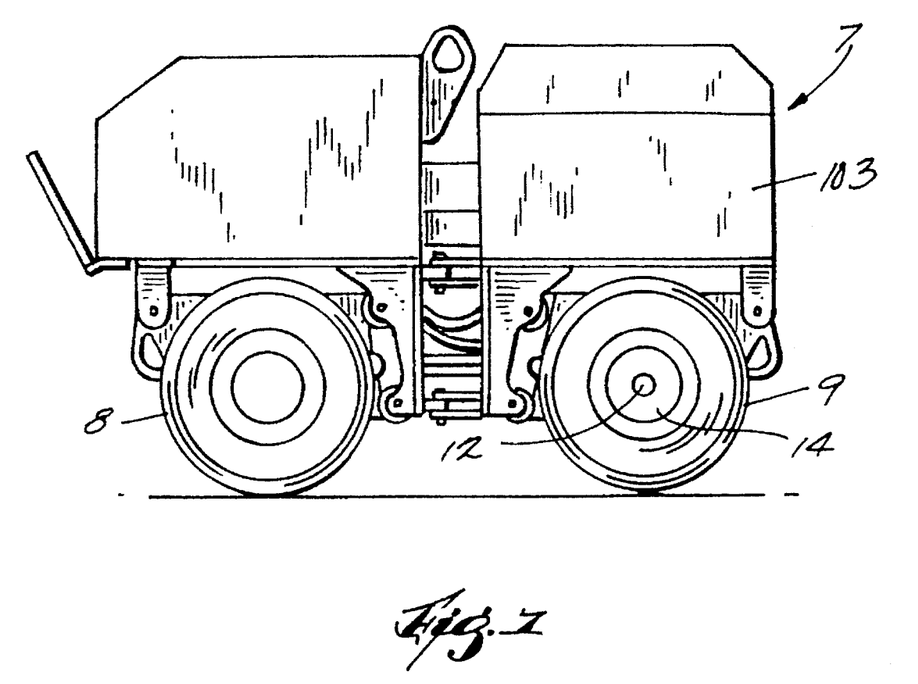
FIG. 7 is a side elevation view of a vehicle on which the drive train and parking brake assemblies of FIGS. 1–6 are usable.

The inventive parking brake assembly is usable with virtually any wheeled vehicle, but is particularly useful with industrial vehicles such as a trench roller such as the one manufactured by Wacker Corporation, Menomonee Falls, Wis., under Model Nos. RT 560 or RT 820. The trench roller 7 (FIG. 7) is rotatably supported on wheels 8, 9 which comprise metal drums. More traditional hard rubber or inflatable wheels could and would be used in other applications. Each of the wheels 8 and 9 is driven by a separate drive train 10 (FIGS. 1–3). Drive train 10 includes a drive axle 12, a hub 14 welded or otherwise fixedly mounted on the outer end of the axle 12 for receiving the wheel 8 or 9 (FIG. 7), and a drive gear assembly 18 mounted on the drive axle 12 adjacent to but spaced from the hub 14. Mounted on the inner portion of the drive gear assembly 18 are a conventional drive motor assembly 20 and the inventive parking brake assembly 22.

The drive gear assembly 18 includes a drive gear 24 encased in a drive gear housing 16 and mating with the drive motor assembly 20 and the parking brake assembly 22. The drive gear housing 16 includes a housing body 26 and a housing cover 28 which face one another to define a chamber 30 therebetween. The housing body 26 is disposed axially outside of the drive gear 24, and the housing cover 28 is disposed axially inside of the drive gear 24 and connected to the housing body 26 by bolts 32. The housing body 26 is rotatably supported on the drive axle 12 by a bearing 34 and is sealed with respect to the axle 12 by a seal ring 36. The housing cover 28 is similarly sealed with respect to the axle 12 by a second seal ring 38, permitting the chamber 30 to be filled with a lubricating fluid through a port normally closed by a plug 39. The housing cover 28 is formed with ears or enlarged peripheral portions 40, 42 having respective bores 41, 43 formed therein for receiving a drive pinion 44 and a brake pinion 46, respectively. The drive pinion 44 and brake pinion 46 mesh with a toothed outer periphery of the drive gear 24, the inner periphery of which is affixed to the axle 12 by a key 48 or the like.

Drive motor assembly 20 may comprise any device capable of supplying motive power to the drive gear 24. In the illustrated embodiment, drive motor assembly 20 is hydrostatically powered by a pump (not shown in FIGS. 1–3) and includes a motor housing 50, a drive shaft 52, and the pinion 44. The outer end of the motor housing 50 is attached to the ear 40 of the gear housing cover 28 by bolts 51. The drive shaft 52 protrudes from the housing cover 28 and into the chamber 30 through the bore 41 in the ear 40. Pinion 44 is splined or otherwise non-rotatably mounted on the drive shaft 52 and meshes with the drive gear 24. Actuating fluid is supplied to the inner end of the motor housing 50 via a fitting 56 to drive the drive gear 24 and axle 12 to rotate in a conventional manner.

The construction of the drive train 10 as thus far described is, except for the portions modified for cooperation with the parking brake assembly 22, conventional and, accordingly, will not be described in further detail.

3. Construction of Parking Brake Assembly

The parking brake assembly 22 may comprise any device capable of braking the drive train 10 by mechanical locking rather than by friction as is conventional in the art. The brake assembly 22 should also be spring applied and fluid released so as to provide emergency braking capability. In the illustrated embodiment, the brake assembly 22 includes a brake housing 60, a piston 62 protruding from the brake housing 60, the pinion 46, a controllable fluid pressure source 64, and a spring 66.

Figure 6:
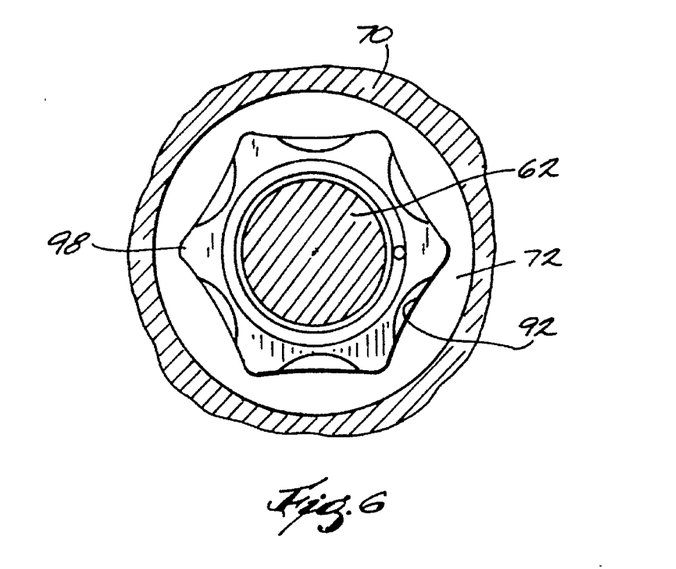
FIG. 6 is a sectional end view taken along the lines 6—6 of FIG. 4.

The purpose of the brake housing 60 is to slidably and rotatably accommodate the piston 62 while simultaneously providing an internal cavity 68 which (1) serves as a pressure chamber for admitting release fluid and, (2) has a portion the walls of which cooperate with the piston 62 to selectively prevent rotation of the piston 62. To this end, the brake housing 60 preferably includes an outer housing body 70, an intermediate locking ring 72, and an inner end cap 74 connected to one another by bolts 76 and sealed by gaskets 80, 82. The outer housing body 70 is formed from metal, is mounted on the ear 42 of the gear housing cover 28 by the bolts 76, and is stepped to present a reduced diameter inner portion 84 and an enlarged outer portion 86. Inner portion 84 is slidably sealed to the piston 62 by an O-ring 78. Outer portion 86 serves as a central portion of the cavity 68. The end cap 74 has a cavity formed therein which forms the inner end of cavity 68 and which communicates with a threaded port 90 formed in the inner end wall thereof. The locking ring 72 is sealingly clamped between the inner end of the outer housing body 70 and the outer end of the end cap 74 and has a generally hexagonal bore 92 (FIG. 6)formed therethrough the function of which will become apparent below.

The piston 62 has an inner or first end portion which is slidably and rotatably journaled in the brake housing 60 by (1) a first slip bearing 94 located in the reduced diameter portion 84 of the housing body 70 and by (2) a second slip bearing 96 located in the end cap 74. A locking flange 98 is fixed to the piston 62 near its inner end and has a size and shape at least generally complementing those of the bore 92 in the locking ring 72. An outer or second end portion of the piston 62 protrudes from the brake housing 60, extends through the bore 43 in ear 42 and into the chamber 30, and non-rotatably receives the pinion 46. The biasing spring 66 rests on a spacer ring 100 at its outer end and engages the locking flange 98 at its inner end to urge the locking flange 98 towards the right as viewed in the drawings. The piston 62, outer housing body 70, locking ring 72, and locking flange 98 are all dimensioned and configured relative to one another so as to permit the piston 62 to slide axially within the outer housing body 70 through a stroke which is at least equals the thickness of the locking ring 72. The locking flange 98 can accordingly move within the cavity 68 (1) from the released position illustrated in FIG. 4 in which the locking flange 98 is located axially outside of the bore 92 of locking ring 72 (2) to the braking position illustrated in FIG. 5 in which the locking flange 98 is located axially within the bore 92 and in which rotation of the locking flange 98 and thus of the piston 62 and pinion 46 relative to the brake housing 60 is prevented by the walls of the bore 92.

Figure 4:
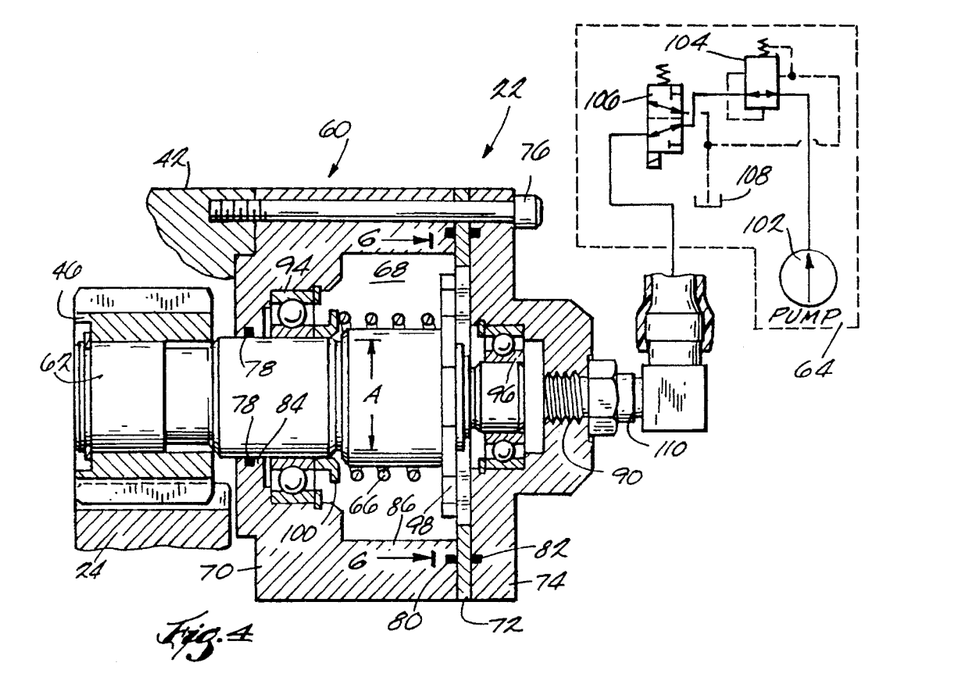
FIG. 4 is a sectional side elevation view of the parking brake assembly of FIGS. 1–3 and of the cooperating portion of the drive train, illustrating the parking brake assembly in a released position.
Figure 5:
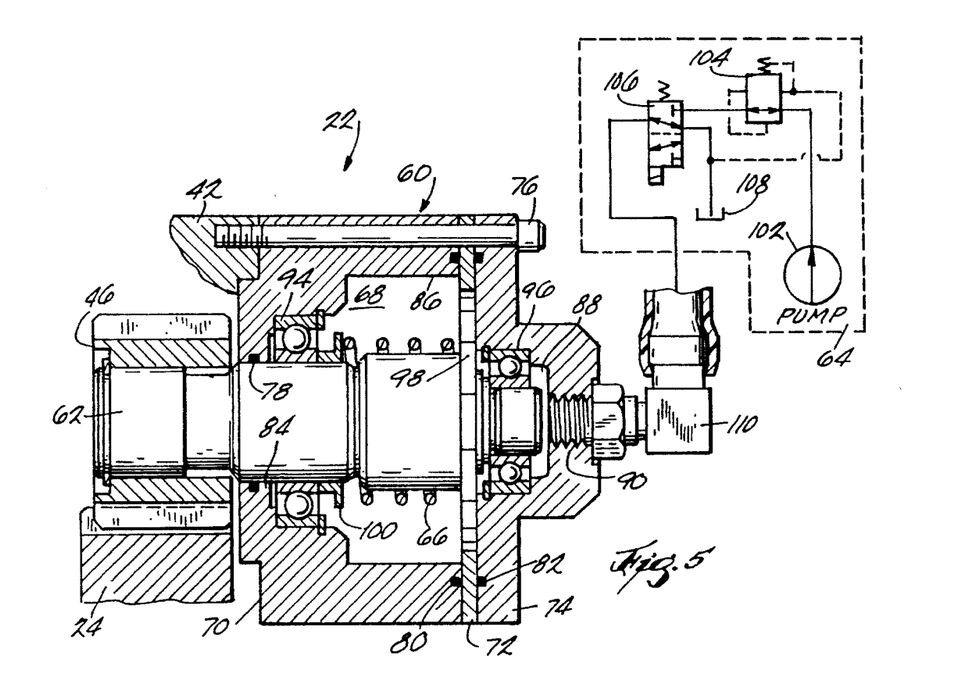
FIG. 5 correspond to FIG. 4 and illustrates the parking brake assembly in an applied or braking position.

The pressure source 64 may comprise any system capable of selectively supplying and venting hydraulic or pneumatic fluid to and from the cavity 68 of the brake housing 60. The preferred source comprises a hydraulic source which is also usable to actuate the hydrostatic drive motor assembly 20. Referring especially to FIGS. 4 and 5, the source 64 includes a pump 102, a pressure reducing valve 104, a three-way, two-position solenoid valve 106, and a reservoir 108. The pump 102 may be powered mechanically, electrically, or hydrostatically by an engine 103 of the vehicle 7 (shown in FIG. 7). The valve 106 includes an inlet port coupled to the pump 102 and pressure control valve 104, an outlet port coupled to the reservoir 108, and a control port coupled to a fitting 110 screwed into the port 90. In the deenergized position illustrated in FIG. 5, the control port of valve 106 is coupled to the reservoir 108 to depressurize the cavity 68 and to permit brake application under the force of spring 66. In the energized position illustrated in FIG. 4, hydraulic fluid at a pressure determined by the reducing valve 104 is supplied to the control port of valve 106 from the pump 102 and thence to the cavity 68, were it drives the piston 62 to the left as viewed in the drawings against the force of the spring 66, thereby uncoupling the locking flange 98 and the locking ring 72 and permitting rotation of piston 62.

An excitation signal could be applied to the solenoid coil of valve 106 to release the brake assembly 22 under a variety of conditions. In order to permit the brake assembly 22 to function in the traditional parking/emergency brake capacity, the signal is preferably generated (1) only when the vehicle engine 103 is running, and (2) only when an emergency stop button (not shown) is not depressed.

4. System Operation

In use, assuming that the vehicle engine 103 is not operating, or that an emergency stop button (not shown) is depressed, the valve 106 remains deenergized to depressurize the cavity 68 and to permit the spring 66 to drive the piston 62 axially to the position illustrated in FIG. 5 in which the locking flange 98 on the piston 62 is positioned within the bore 92, thereby preventing rotation of the piston 62 relative to the brake housing 60. The piston 62 would also be driven into this position by the spring 66, even in the presence of an excitation signal, in the event of the failure of the pump 104 or of any of the associated valves, hoses, fittings, etc. Rotation of the drive gear 24 is prevented by virtue of the meshing of the drive gear 24 with the pinion 46, thereby preventing rotation of the axle 12, hub 14, and the associated wheel 9.

The mechanical locking of the drive train 10 provides more secure braking than could be provided by much larger and more expensive friction brakes. Indeed, the capacity of the brake assembly 22 is limited only by the strength of the drive gear 24, pinion 46, locking flange 98, and locking ring 72. All of these components can be made relatively small while still providing more than adequate braking for maintaining the vehicle on an incline which is at least as steep as the steepest incline up which the vehicle is capable of climbing. Moreover, because the pinion 46 preferably (but not necessarily) meshes with the drive gear 24 at all times, and because the drive gear 24 and pinion 46 are lubricated by fluid in the chamber 30, there is essentially no wear of the brake components.

Assuming now that the system is fully operational and that the operator wishes to operate the vehicle 7, an excitation signal is transmitted to the coil of valve 106 upon demand to shift the valve 106 to the position illustrated in FIG. 4 in which it permits the supply of pressurized fluid to the cavity 68 from the pump 102 and pressure control valve 104. Fluid in cavity 68 acts on the area A of the piston (FIG. 4) to apply a force to the piston 62 equal to the pressure P times the area A. Assuming that this force is greater than the force applied by the spring 66 (as would normally be the case when the pressure source 64 is operational), the piston 62 is driven to the left as viewed in the drawings to withdraw the locking flange 98 from the locking ring 72 as illustrated in FIG. 4. The piston 62, pinion 46, drive gear 24, and remainder of the drive train 10 and wheel 9 are now free to rotate without any interference from the locking ring 72.

Because braking is performed by mechanical locking rather than by friction, the return force which is imposed by the spring 66 and which must be opposed by hydraulic pressure to release the brake assembly 22 is dramatically lower than the corresponding forces of a friction brake. Indeed, the inventive parking brake assembly 22 has a release pressure of about 50 psi—about one-sixth that of a comparable friction brake assembly. The capacity of the pressure source 64 and associated hoses, valves, and fittings can be reduced accordingly, thereby sharply reducing the size and cost of the system. System size and cost are further reduced by virtue of the fact that the drive train 10 is locked by a relatively small pinion 46 meshing with the drive gear 24 rather than a large system of friction pads. The system is further simplified due to the fact that the piston 62 acts both as a release piston for the brake assembly and as a shaft for the pinion 46.

Many changes and modifications could be made to the invention without departing from the spirit thereof. For instance, the locking flange 98 and locking ring 72 need not be configured as illustrated and need not be present at all, so long as some structure is provided which mechanically locks a component of a drive train 10 from rotating in the absence of fluid pressure in the cavity 68 and unlocks these components to permit drive train rotation in the presence of fluid pressure in the cavity above a designated threshold. In addition, the piston 62 need not be directly subject to fluid pressure, but could be used in conjunction with a separate piston subjected to fluid pressure. Moreover, while a hydraulic pressure source 64 is illustrated, a pneumatic, electric, or mechanical source could conceivably be used.

A manually operated valve could also be used in place of the disclosed solenoid actuated valve 106. However, a solenoid actuated valve is preferred because it can be more easily tied into operation of the vehicle.

The scope of these and other changes will become apparent from a reading of the appended claims.

I claim:

1. A braking system comprising:
   (A) a drive train having a toothed rotatable component; and
   (B) a parking brake assembly for preventing undesired rotation of said rotatable component, said parking brake assembly comprising a stationary member and a piston which 1) presents a toothed member meshing with the teeth of said rotatable component and which 2) is movable axially from a first position in which said piston is locked to said stationary member such that said and said rotatable component are mechanically locked from rotation with respect to said stationary member to a second position in which said piston is unlocked from said stationary member such that said piston and said rotatable component are freely rotatable with respect to said stationary member.

2. A braking system as defined in claim 1, wherein said parking brake assembly further comprises a brake housing, and wherein said piston has a first end slidably and sealingly disposed in said brake housing and a second end protruding from said brake housing and engaging said rotatable component of said drive train.

3. A braking system comprising:
   (A) a drive train having a rotatable component; and
   (B) a parking brake assembly for preventing undesired rotation of said rotatable component, said parking brake assembly comprising
      (1) a brake housing, and
      (2) a piston which at least selectively engages said rotatable component of said drive train and which is movable axially from a first position in which said piston and said rotatable component are mechanically locked from rotation to a second position in which said piston and said rotatable component are freely rotatable, and wherein said piston has a first end slidably and sealingly disposed in said brake housing and a second end protruding from said brake housing and engaging said rotatable component, wherein said rotatable component comprises a drive gear for said wheel, and further comprising a brake pinion which is non-rotatably mounted on said second end of said piston and which meshes with said drive gear.

4. A braking system comprising:
   (A) a drive train having a rotatable component; and
   (B) a parking brake assembly for preventing undesired rotation of said rotatable component, said parking brake assembly comprising
      (1) a brake housing, and
      (2) a piston which at least selectively engages said rotatable component of said drive train and which is movable axially from a first position in which said piston and said rotatable component are mechanically locked from rotation to a second position in which said piston and said rotatable component are freely rotatable, and wherein said piston has a first end slidably and sealingly disposed in said brake housing and a second end protruding from said brake housing and engaging said rotatable component, wherein said brake housing has a cavity formed therein, a portion of which has a designated, non-circular shape, and said brake assembly further comprising a locking flange mounted on said first end of said piston and having a shape which at least generally complements that of said portion of said cavity, said locking flange being located within said portion of said cavity and engaging a wall thereof to prevent rotation of said piston when said piston is in said first position and being located outside of said portion of said cavity to permit rotation of said piston when said piston is in said second position.

5. An assembly as defined in claim 4, wherein said brake housing includes
   (1) a body having an internal bore of circular cross-section,
   (2) a locking ring which is mounted on an outer end of said body and which presents said portion of said cavity, and
   (3) an end cap which abuts said locking ring and which clamps said locking ring in position,
and further comprising first and second slip bearings which slidably and rotatably mount said piston in said brake housing.

6. An assembly comprising:
   (A) a drive train having a rotatable component; and
   (B) a parking brake assembly for preventing undesired rotation of said rotatable component, said parking brake assembly comprising
      (1) a brake housing,
      (2) a piston which at least selectively engages said rotatable component and which is movable axially from a first position in which said piston and said rotatable component are mechanically locked from rotation to a second position in which said piston and said rotatable component are freely rotatable, and
      (3) a spring which biases said piston axially towards said first position and a source of fluid pressure which is selectively operable to drive said piston axially into said second position against the biasing force of said spring.

7. An assembly as defined in claim 6, wherein said source of fluid pressure comprises a hydraulic pressure source and a valve alternately coupling said piston to said hydraulic pressure source and to a reservoir.

8. A braking system comprising:
   (A) a drive train supplying power to a wheel, said drive train comprising a toothed rotatable component; and
   (B) a parking brake assembly for preventing undesired rotation of said wheel, said parking brake assembly comprising a stationary member and a piston, wherein said piston 1) presents a toothed component which at least selectively engages the teeth of said rotatable component and 2) is movable from a first position in which said piston is locked to said stationary member such that said piston and said rotatable component are mechanically locked from rotation to a second position in which said piston is unlocked from said stationary member such that said piston and said rotatable component are freely rotatable.

9. A braking system comprising:

(A) a drive train for supplying power to a ground engaging wheel, said drive train including
   (1) a hub on which said wheel is non-rotatably mounted,
   (2) an axle on which said hub is non-rotatably mounted,
   (3) a drive gear non-rotatably mounted on said axle, and
   (4) a motor supplying motive power to said drive gear; and (B) a parking brake assembly for preventing undesired rotation of said wheel, said parking brake assembly comprising (1) a piston and (2) a pinion which is mounted on said piston and which meshes with said drive gear, said piston being slidable axially from a first position in which said pinion and said drive gear are mechanically locked from rotation to a second position in which said pinion and said drive gear are freely rotatable.

10. A braking system as defined in claim 9, further comprising a spring which biases said piston towards said first position and a source of fluid pressure which is selectively operable to drive said piston into said second position against the biasing force of said spring.

11. A braking system as defined in claim 9, wherein
said drive train further comprises a gear housing encasing said drive gear, and
said brake assembly further comprises a brake housing mounted on said gear housing, and wherein said piston has a first end slidably and sealingly disposed in said brake housing and a second end protruding from said brake housing, extending into said gear housing, and receiving said pinion.

12. A braking system as defined in claim 11, wherein said brake housing has a cavity formed therein a portion of which has a designated, non-circular shape, and further comprising a locking flange mounted on said first end of said piston and having a shape which at least generally complements that of said portion of said cavity, said locking flange being located within said portion of said cavity to prevent rotation of said piston when said piston is in said first position and being located outside of said portion of said cavity to permit rotation of said piston when said piston is in said second position.

13. A braking system as defined in claim 11, wherein said motor includes a motor housing affixed to said gear housing, a drive shaft protruding from said motor housing and extending into said gear housing, and a pinion which is non-rotatably mounted on said drive shaft and which meshes with said drive gear.

14. A braking system as defined in claim 9, wherein said brake assembly and said motor are both hydraulically actuated.

15. A method of braking a ground engaging wheel, said method comprising:

(A) providing 1) a drive train for said ground engaging wheel and 2) a parking brake assembly which includes a piston and a stationary member, said drive train having a toothed rotatable component and said piston presenting a toothed member meshing with said toothed rotatable component;

(B) permitting free rotation of said piston and said rotatable component; and then (C) preventing rotation of said piston and said rotatable component by moving said piston axially from a first position in which said piston is locked to said stationary member such that said piston and said rotatable component are mechanically locked from rotation to a second position in which said piston is unlocked from said stationary member such that said piston and said rotatable component are freely rotatable.

16. A method of braking a ground engaging wheel, said method as defined in claim 15, wherein said preventing step includes applying a fluid actuating force to said piston of sufficient magnitude to overcome a spring-applied biasing force.

17. A method of braking a ground engaging wheel, said method comprising:

(A) permitting free rotation of a drive train for said ground engaging wheel; and then (B) preventing rotation of said drive train by moving a piston of a parking brake assembly axially from a first position in which said piston and said drive train are mechanically locked from rotation to a second position in which said piston and said drive train are freely rotatable, wherein said drive train includes a drive gear and said parking brake assembly includes a pinion mounted on a first end of said piston and meshing with said drive gear, and wherein said preventing step comprises axially sliding said piston into a position in which a second end of said piston engages a stationary member to lock said piston from rotation, thereby preventing rotation of said pinion and said drive gear.

18. A method of braking a ground engaging wheel, said method as defined in claim 17, wherein said preventing step comprises moving said piston from a first location in which a non-circular locking flange, mounted on an end of said piston remote from said pinion, is located outside of a complimentary shaped cavity, to a second position in which said locking flange is located within said cavity and is prevented from rotating by engaging a wall of said cavity.

* * * * *